US010666682B2

(12) United States Patent
Akkawi et al.

(10) Patent No.: US 10,666,682 B2
(45) Date of Patent: May 26, 2020

(54) SYSTEMS AND METHODS FOR ALLOWING FLEXIBLE CHIP CONFIGURATION BY EXTERNAL ENTITY WHILE MAINTAINING SECURED BOOT ENVIRONMENT

(71) Applicant: Cavium, LLC, Santa Clara, CA (US)

(72) Inventors: Isam Akkawi, Santa Clara, CA (US); Darren Braun, San Jose, CA (US); Wilson Parkhurst Snyder, II, Holliston, MA (US); Bryan Chin, San Diego, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 876 days.

(21) Appl. No.: 14/870,675

(22) Filed: Sep. 30, 2015

(65) Prior Publication Data
US 2016/0112264 A1    Apr. 21, 2016

Related U.S. Application Data

(60) Provisional application No. 62/064,351, filed on Oct. 15, 2014.

(51) Int. Cl.
*H04L 29/06* (2006.01)
*H04L 12/24* (2006.01)
*G06F 21/57* (2013.01)

(52) U.S. Cl.
CPC ............ *H04L 63/20* (2013.01); *G06F 21/575* (2013.01); *H04L 41/0813* (2013.01); *H04L 41/28* (2013.01)

(58) Field of Classification Search
CPC .......... H04L 63/20; H04L 41/00; H04L 41/08; H04L 41/0813; H04L 41/28
(Continued)

(56) References Cited

U.S. PATENT DOCUMENTS 8,417,774 B2 *   4/2013  Flynn ................... G06F 1/183
                                                                  700/20
2002/0087553 A1 * 7/2002  Kitahara ............ G06F 21/6245
(Continued)

OTHER PUBLICATIONS

"Network Controller Sideband Interface (NC-SI) Specification" published by Distributed Management Task Force, Inc.; Date: Jul. 21, 2009; Version: 1.0.0. (Year: 2009).*
(Continued)

*Primary Examiner* — Kamal B Divecha
*Assistant Examiner* — Sandarva Khanal

(57) ABSTRACT

A new approach is proposed that contemplates systems and methods to support flexible reconfiguration of a network chip by an external entity, such as a baseboard management controller (BMC), while maintaining a secured environment for the chip so that it can be booted securely. The network chip is configured to designate one or more of its networking ports to the BMC and allow the BMC to configure the designated networking ports without violating the secure areas of the network chip. The network chip is configured to allow the BMC to access a plurality of registers of the network chip via a Network Controller Sideband Interface (NC-SI) block of the network chip by issuing a plurality NC-SI compliant commands. By configuring the designated networking ports, the BMC is configured to establish a data path to a management software of a platform that includes the network chip though the designated networking ports.

38 Claims, 2 Drawing Sheets

(58) Field of Classification Search
CPC ... H04L 43/0817; G06F 13/00; G06F 15/177; G06F 11/1417; G06F 9/4401; G06F 21/575; G06F 21/71; G06F 2213/3808; G06F 11/2242; G06F 15/16; G06F 9/00; H03L 7/00
See application file for complete search history.

(56) References Cited

U.S. PATENT DOCUMENTS

| | | | |
|---|---|---|---|
| 2003/0126226 A1* | 7/2003 | Ramey | H04L 45/00 709/215 |
| 2007/0027981 A1* | 2/2007 | Coglitore | H04L 43/0817 709/224 |
| 2007/0141895 A1* | 6/2007 | Karstens | G06F 1/181 439/490 |
| 2009/0055637 A1* | 2/2009 | Holm | G06F 21/575 713/1 |
| 2009/0210601 A1* | 8/2009 | Greenstein | H04L 69/32 710/305 |
| 2012/0204042 A1* | 8/2012 | Sistla | G06F 1/3206 713/310 |
| 2013/0326039 A1* | 12/2013 | Shah | H04L 41/04 709/223 |

OTHER PUBLICATIONS

"A Penetration Tester's Guide to IPMI and BMCs"; Blog Post created by "hdmoore"; created on Jul. 2, 2013; Last modified on Jun. 27, 2014. (Year: 2014).*

* cited by examiner

US 10,666,682 B2

SYSTEMS AND METHODS FOR ALLOWING FLEXIBLE CHIP CONFIGURATION BY EXTERNAL ENTITY WHILE MAINTAINING SECURED BOOT ENVIRONMENT

CROSS-REFERENCE TO RELATED APPLICATIONS

This application claims the benefit of U.S. Provisional Patent Application No. 62/064,351, filed Oct. 15, 2014, and entitled "Systems and Methods for Allowing Flexible Chip Configuration by External Entity while Maintaining Secure Boot Environment," which is incorporated herein in its entirety by reference.

BACKGROUND

A typical server platform may utilize an external smart entity/unit (or multiple external entities/units) to manage functions of the platform via an interface to the management software of the platform, which may run on a remote computer or on processor(s) of the server platform. Here, the server platform can be but is not limited to a server, a network device, a network chip/controller, or other type of hardware device. The external entity is referred to as a baseboard management controller (BMC), which is a specialized service processor that monitors the physical state of the platform and communicates with the system management software of the platform through a network connection.

In some embodiments, the BMC is configured to communicate with the system management software over a local area network (LAN) over an interface defined under standards such as Intelligent Platform Management Interface (IPMI) protocol. In some embodiments, the BMC has a separate network interface to the LAN. In some alternative embodiments, the BMC shares the network interface with the platform being managed, referred to herein as in-band management. To facilitate the in-band management, some of the current generation of network chips provide a separate port to interface the BMC to the network other than the interface used by the network chips for the normal network traffic. In some embodiments, the interface to the BMC can be accomplished through a "Network Controller Sideband Interface (NC-SI) configured to support network communication between the BMC and the system management software under in-band management.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
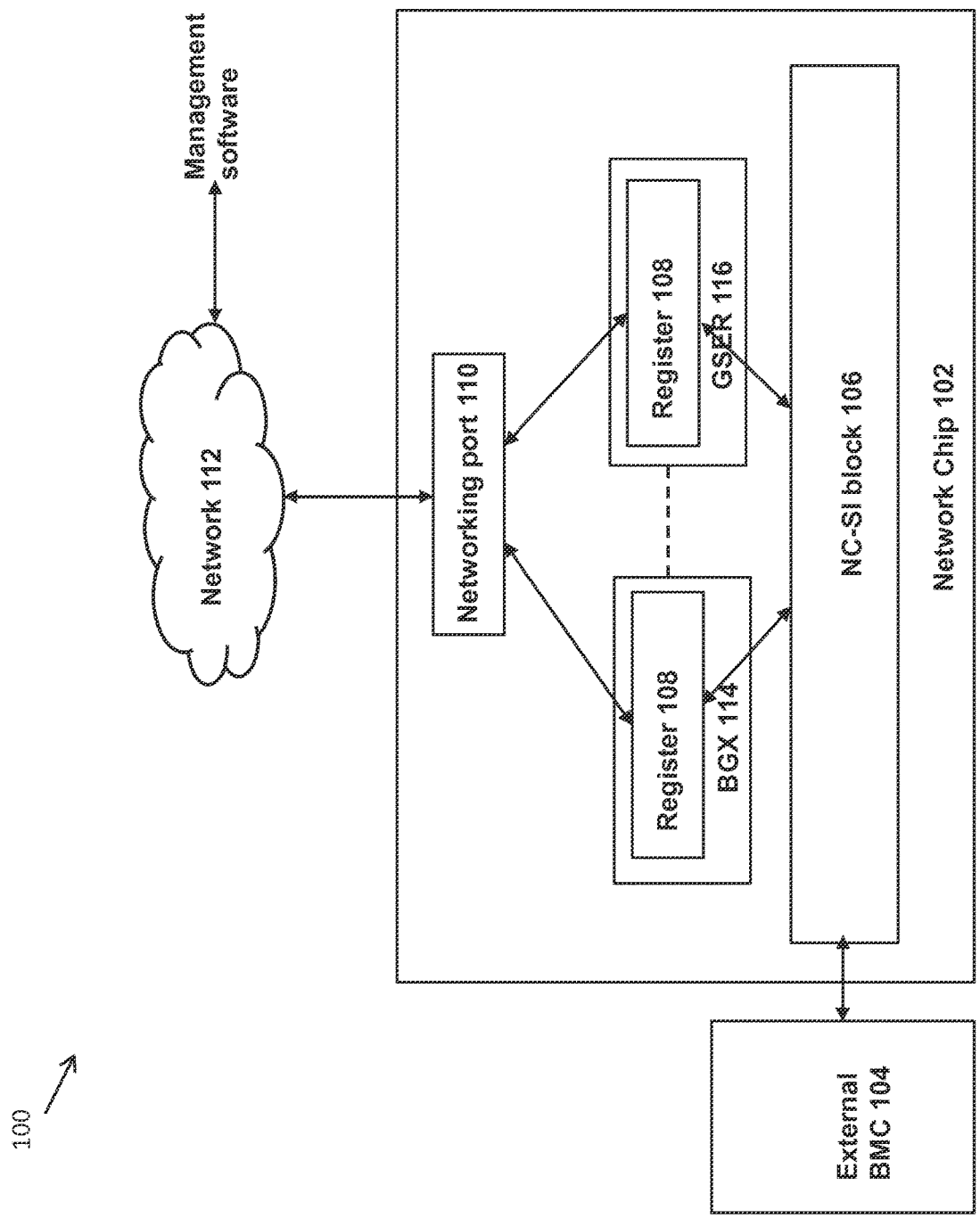
FIG. 1 depicts an example of a diagram of a system to support flexible chip configuration while maintaining a secured boot environment in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support flexible reconfiguration of a network chip by an external entity, such as a baseboard management controller (BMC), while maintaining a secured environment for the chip so that it can booted securely. Specifically, the network chip is configured to provide and designate one or more of its networking ports to the BMC and allow the BMC to configure the designated networking ports without violating the secure areas of the network chip. To this end, the network chip is configured to allow the BMC to access a plurality of registers of the network chip via an Network Controller Sideband interface (NC-SI) block of the network chip, wherein the NC-SI block serves as the interface for the BMC to access internal components, e.g., the registers, of the network chip by issuing a plurality NC-SI compliant commands. By configuring the designated networking ports via the registers, the BMC is configured to establish a data path to a management software of a system/platform that includes the network chip though the designated networking ports.

FIG. 1 depicts an example of a diagram of a system 100 to support flexible chip configuration while maintaining a secured boot environment. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a network chip/device 102, a baseboard management controller (BMC) 104 external to the network chip 102. The network chip 102 may further include an NC-SI interface block 106 for interacting with the external BMC 104, and a plurality of registers 108 for configuring one or more networking ports 110, and said networking ports 110 designated to serve network communication for the external BMC 104.

In the example of FIG. 1, the external BMC 104 communicates with the management software of the platform of the network chip 102 over a network 112 following certain communication protocols, which can be but are not limited to TCP/IP protocol and/or UDP protocol. Here, the network 112 can be but is not limited to, internet, intranet, wide area network (WAN), local area network (LAN), wireless network, Bluetooth, WiFi, mobile communication network, or any other network type. The physical connections of the network 112 and the communication protocols are well known to those of skill in the art.

In some embodiments, the network chip 102 is a System On Chip (SOC), which is multi-core embedded hardware comprising one or more of coprocessors/hardware cores, a memory such as RAM, and/or a storage unit such as a non-volatile memory with software instructions stored in for practicing one or more processes. In some embodiments, the network chip 102 integrates a network interface(s) such as the NC-SI interface block 106 on the same chip. In some embodiments, the network chip 102 can support the external BMC 104 that has a separate port to the network 112. In some embodiments, when the external BMC 104 works under in-band management, i.e., it shares the one or more networking ports 110 integrated in the network chip 102, the network chip 102 is configured to provide such networking ports 110 to the external BMC 104 and enable a path from the external BMC 104 to the on-chip networking ports 110 through the NC-SI interface block 106.

In some embodiments, the networking ports 110 of the network chip 102 are highly configurable, and can be setup properly to allow the network traffic (e.g., data packets) such as traffic under IPMI to flow to and from the external BMC 104. In some embodiments, network chip 102 is configured to setup these networking ports 110 via embedded software codes so that the network traffic can flow to and from the external BMC 104. In some embodiments, the external BMC 104 is enabled to configure the networking ports 110 of the network chip 102 by itself so that the external BMC 104 may function independently of the cores of the network chip 102. Under such scenario, the external BMC 104 may communicate with the management software of the platform of the network chip 102 over the network even when the cores of the network chip 102 are not functioning properly so that, for non-limiting examples, the external BMC 104 may help to diagnose a problem of the network chip 102 and/or alert the management software on the status of the malfunctioned network chip 102. Importantly, although the network chip 102 allows the external BMC 104 to configure the networking ports 110 by itself, the network chip 102 is configured to provide such access to the networking ports 110 by the external BMC 104 without circumventing the security feature of the network chip 102 or allowing the external BMC 104 to access to secured areas of the network chip 102, which can be used to boot the network chip 102 securely.

In some embodiments, the external BMC 104 is configured to configure the networking ports 110 of the network chip 102 by initiating/issuing a plurality of NC-SI compliant commands through the NC-SI block 106 to configure a plurality of registers 108 of the network chip 102. Here, the plurality of registers 108 being directly accessed by the external BMC 104 include at least those associated with networking-related components of the network chip 102 such as common Ethernet interface (BGX) 114 and serializer/desirializer (GSER) 116, which are responsible for interfacing to the network 112 via the networking ports 110 and merging/splitting the management traffic going from/to the external BMC 104, respectively.

For non-limiting examples, the NC-SI block 106 is configured to support one or more of the following NC-SI compliant commands initiated by the external BMC 104:

Clear Initial State, which is used by the external BMC 104 to confirm that the network chip 102 and its registers 108 are in the Initial State;

Enable Channel, which is used by the external BMC 104 to enable the NC-SI block 106 and to cause the forwarding of bidirectional controller management packets between the external BMC 104 and the network chip 102 to start;

Disable Channel, which is used by the external BMC 104 to disable the NC-SI block 106 and to cause the forwarding of bidirectional controller management packets between the external BMC 104 and the network chip 102 to cease;

Reset Channel, which is used by the external BMC 104 to synchronously put the network chip 102 back to the Initial State;

Enable Channel Network TX, which is used by the external BMC 104 to explicitly enable the transmission of pass-through packets to the network;

Disable Channel Network TX, which is used by the external BMC 104 to explicitly disable the transmission of pass-through packets onto the network.

Note that the commands initiated by the external BMC 104 can potentially access the entire (or a portion of the) address space of registers and memories of the network chip 1102, which may cause concerns over the security of the network chip 102. In some embodiments, the network chip 102 is configured to designate the registers 108 to be accessed by the external BMC 104 to be in either a secure address map or a non-secure address map by configuring the corresponding devices of the registers 108 in the address space of the network chip 102. One possible way to do this is to have a bit that corresponds to each device (i.e., Device ID), indicating if access to that device is required to be secure or not. Additionally, the network chip 102 is further configured to designate certain networking ports 110, e.g., one or more associated with BGX 114, for the external BMC 104 to communicate with the management software over the network 112. The network chip 102 is further configured to disallow access to certain networking ports 110 by the external BMC 104. As such, the network chip 102 may assert fine grain control over which registers 108 and/or networking ports 1110 the external BMC 104 can access via issued commands issued through the NC-SI block 106 under either secure or non-secure modes.

In some embodiments, the NC-SI block 106 is configured to provide a permissions table that contains values indicating allowed access to the registers 108 in the network chip 102 by the external BMC 104, wherein the default values in the permissions table allow minimal and non-secured access by the external BMC 104 to only those registers 108 that are network (NC-SI, Ethernet block and/or serialization) related. Access to those registers 108 related to secured operation/boot of the network chip 102 can only be given to the external BMC 104 by means of a secured entity (e.g., Boot Rom). The following is a non-limiting example of a permissions table where up to 116 pairs of base/limit or hi/lo addresses of registers indicating allowed register address ranges for access by the external BMC 104:

NCSI_TX_NCP_PERM(0 . . . 15)_TABLE_HI=NCSI TX NCP Permissions Table Hi Registers NCSI_TX_NCP_PERM(0 . . . 15)_TABLE_LO=NCSI TX NCP Permissions Table LO Registers For any command issued by the external BMC 104 that requires a read or write operation to one of the registers 108, the NC-SI block 106 matches the requested address of the register 108 in the command against these registers listed in the permissions table. If the address does not fall within one of the hi/lo pairs of address range, i.e., not within LOW[n] <=requested address <=HI[n] for at least one of the hi/lo address pairs, the NC-SI block 106 is configured to return a failed response command to the external BMC 104 and deny access to the register by the external BMC 104. In some embodiments, the highest bit in the Hi/Lo registers (e.g., bit 63) can be used to indicate secure or non-secure access to the registers 108.

In some embodiments, the NC-SI block 106 is also configured to provide a secured register access indicator that includes at least two bits:
- Bit 1: enable permissions table checking by the NC-SI block 106;
- Bit 0: override the permission table, and allow for full access to the address space of the registers in the network chip 102.

In some embodiments, the NC-SI block 106 is also configured to maintain the permissions table above in a secured address space, wherein the permissions table cannot be changed except by a secured request. Since the reset value for Bit 0 above is 0 (i.e., the command from the external BMC 104 needs to go through the permission table), the pairs of hi/lo addresses of registers in the permission table are reset to only allow access by the external BMC 104 to the registers related to Ethernet related registers (e.g., BGX 114) if they are in the non-secure space. Granting further access by the external BMC 104 would require a secure write from one of the core processors of the network chip 102.

Although a permissions tabled-based approach is described above, in some alternative embodiments, the NC-SI block 106 is configured to check the access permission to the registers 108 by the external BMC 104 based on a plurality of pre-specified access policies, which may provide additional level of flexibility for access control to the registers 108. The same mechanism can also be used to allow access not only to the registers 108, but also to other internal components of the network chip 102.

During the operation of the system 100, when the NC-SI block 106 is first powered up, the external BMC 104 is configured to discover and configure the network chip 102 by issuing the commands discussed above in order to enable data pass-through operation to the network 112. In some embodiments, in addition to the configurations of the registers 108 associated with the networking port 110, the external BMC 104 is also configured to set other parameters of the network chip 102 including but not limited to MAC addresses, Layer 2 filtering, communication channel setting, etc. Once the network chip 102 is configured, the external BMC 104 is configured to transmit and receive pass-through packets to and from the network via the designated networking port 110 and the NC-SI block 106 of the network chip 102.

The traffic going from/to the external BMC 104 passes through the NC-SI block 106, which provide an interface and protocol control over an NC-SI bus between the network chip 102 and the external BMC 104. During its operation, the NC-SI block 106 receives traffic/packet from the external BMC 104 and examines the destination MAC address and Ethernet type in the traffic to determine whether the packet is an NC-SI command or a pass through packet. The NC-SI block 106 then either processes the traffic if it includes an NC-SI compliant command or, in case of pass through packet, passes the traffic to the designated networking port to be transmitted over the network. When the NC-SI block 106 receives traffic over the network through the networking ports 110, the NC-SI block 106 transmits the received traffic to the external BMC 104. In some embodiments, the NC-SI block 106 may also provide the responses/processing results of the NC-SI command to the external BMC 104. As such, the NC-SI block 106 of the network chip 102 establishes and enables a data path between the external BMC 104 and the management software over the network through the network chip 102.

In some embodiments, the external BMC 104 is configured to handle errors that may occur during operation or configuration of the network chip 102. For a non-limiting example, the network chip 102 may have an internal state change or reset that causes it to enter a state in which it requires a level of reconfiguration or a data glitch on the NC-SI block 106 could have caused an NC-SI command to be dropped by the network chip 102, requiring the external BMC 104 to retry the command. In certain situations, the network chip 102 can generate an asynchronous event on the NC-SI block 106, which is then configured to send event notifications to the external BMC 104 to be processed as appropriate.

Figure 2:
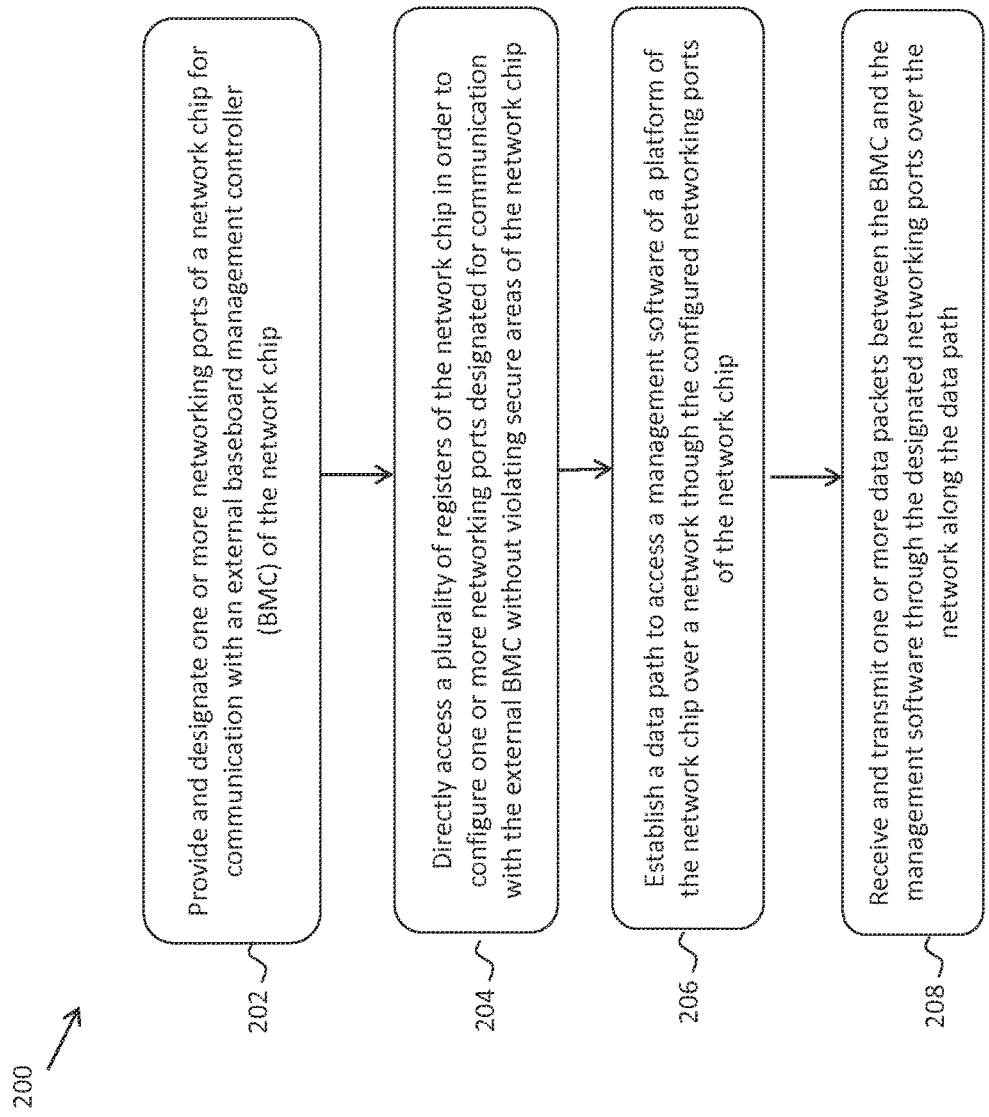
FIG. 2 depicts a flowchart of an example of a process to support flexible chip configuration while maintaining a secured boot environment in accordance with some embodiments.

FIG. 2 depicts a flowchart of an example of a process to support flexible chip configuration while maintaining a secured boot environment. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where one or more networking ports of a network chip are provided and designated for communication with an external baseboard management controller (BMC) of the network chip. The flowchart 200 continues to block 204, where the BMC is allowed to directly access a plurality of registers of the network chip via an Network Controller Sideband Interface (NC-SI) block in order to configure the one or more networking ports for communication without violating secure areas of the network chip. The flowchart 200 continues to block 206, where a data path is established for the BMC to access a management software of a platform of the network chip over a network though the configured networking ports of the network chip. The flowchart 200 ends at block 208, where data packets are received and transmitted by the network chip between the BMC and the management software through the designated networking ports over the network along the data path.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A system to support flexible chip configuration while maintaining a secured boot environment, comprising:
   an external baseboard management controller (BMC) of a network chip configured to:

directly access a plurality of registers of the network chip in order to configure one or more networking ports designated for communication with the external BMC without violating secure areas of the network chip;
establish a data path to access a management software of a platform of the network chip over a network through the networking ports of the network chip;
said network chip configured to:
provide and designate the one or more networking ports for communication with the external BMC;
receive and transmit data packets between the external BMC and the management software through the designated networking ports over the network along the data path.

2. The system of claim 1, wherein:
the network chip is a System On Chip (SOC), which includes one or more coprocessors/cores and memory units.

3. The system of claim 1, wherein:
the external BMC is enabled to configure the networking ports of the network chip by itself so that the external BMC functions independently of the network chip.

4. The system of claim 3, wherein:
the external BMC is configured to communicate with the management software over the network even when cores of the network chip are not functioning properly.

5. The system of claim 1, wherein:
the network chip is configured to provide access to the networking ports by the external BMC without circumventing security feature of the network chip or allowing the external BMC to access to secured areas of the network chip used to boot the network chip securely.

6. The system of claim 1, wherein:
the external BMC is configured to configure the networking ports of the network chip by initiating/issuing a plurality of Network Controller Sideband Interface (NC-SI) compliant commands to configure the plurality of registers of the network chip.

7. The system of claim 1, wherein:
the plurality of registers being directly accessed by the external BMC include at least those associated with networking-related components of the network chip, wherein the registers are responsible for interfacing to the network via the networking ports and/or merging/splitting management traffic going from/to the external BMC.

8. The system of claim 1, wherein:
the network chip is configured to designate the registers to be accessed by the external BMC to be in either a secure address map or a non-secure address map by configuring corresponding devices of the registers in an address space of the network chip.

9. The system of claim 1, wherein:
the network chip is configured to assert control over which registers and/or networking ports the external BMC is allowed access.

10. The system of claim 1, wherein:
the external BMC is configured to handle errors that may occur during operation or configuration of the network chip.

11. The system of claim 1, wherein:
the network chip integrates an Network Controller Sideband Interface (NC-SI) block on the same chip, wherein the NC-SI block is configured to provide an interface and protocol control between the network chip and the external BMC over an NC-SI bus.

12. The system of claim 11, wherein:
the external BMC works under in-band management, wherein it shares the one or more networking ports integrated in the network chip through the NC-SI block.

13. The system of claim 11, wherein:
the NC-SI block is configured to provide a permissions table that contains values indicating allowed access to the registers in the network chip by the external BMC, wherein default values of the values in the permissions table allow minimal and non-secured access by the external BMC to only those registers that are network related.

14. The system of claim 13, wherein:
the NC-SI block is configured to match a requested address of the registers in a command by the external BMC that requires a read or write operation to one of the registers against the values listed in the permissions table to determine allowed access to the registers by the external BMC.

15. The system of claim 13, wherein:
the NC-SI block is configured to provide a secured register access indicator that enable permissions table checking.

16. The system of claim 13, wherein:
the NC-SI block is configured to maintain the permissions table in a secured address space, wherein the permissions table cannot be changed except by a secured request.

17. The system of claim 11, wherein:
the NC-SI block is configured to check access permission to the registers by the external BMC based on a plurality of pre-specified access policies.

18. The system of claim 11, wherein:
the NC-SI block is configured to examine each of the data packets to determine whether the data packet is an NC-SI command or a pass through packet.

19. The system of claim 18, wherein:
the NC-SI block is configured to either process the data packet if it includes an NC-SI compliant command or pass the data packet to the designated networking port to be transmitted over the network if it is a pass through packet.

20. The system of claim 19, wherein:
the NC-SI block is configured to provide responses/processing results of the NC-SI command to the external BMC.

21. A method to support flexible chip configuration while maintaining a secured boot environment, comprising:
providing and designating one or more networking ports of a network chip for communication with an external baseboard management controller (BMC) of the network chip;
directly accessing a plurality of registers of the network chip in order to configure one or more networking ports designated for communication with the external BMC without violating secure areas of the network chip;
establishing a data path to access a management software of a platform of the network chip over a network through the networking ports of the network chip;
receiving and transmitting one or more data packets between the external BMC and the management software through the designated networking ports over the network along the data path.

22. The method of claim 21, further comprising:
enabling the external BMC to configure the networking ports of the network chip by itself so that the external BMC functions independently of the network chip.

23. The method of claim 22, further comprising:
enabling the external BMC to communicate with the management software over the network even when cores of the network chip are not functioning properly.

24. The method of claim 21, further comprising:
providing access to the networking ports by the external BMC without circumventing security feature of the network chip or allowing the external BMC to access to secured areas of the network chip used to boot the network chip securely.

25. The method of claim 21, further comprising:
configuring the networking ports of the network chip by initiating/issuing a plurality of NC-SI compliant commands to configure the plurality of registers of the network chip.

26. The method of claim 21, further comprising:
designating the registers to be accessed by the external BMC to be in either a secure address map or a non-secure address map by configuring corresponding devices of the registers in an address space of the network chip.

27. The method of claim 21, further comprising:
asserting control over which registers and/or networking ports the external BMC is allowed access.

28. The method of claim 21, further comprising:
handling errors that may occur during operation or configuration of the network chip.

29. The method of claim 21, further comprising:
integrating an Network Controller Sideband Interface (NC-SI) block with the network chip on the same chip, wherein the NC-SI block is configured to provide an interface and protocol control between the network chip and the external BMC over an NC-SI bus.

30. The method of claim 29, further comprising:
enabling the external BMC to work under in-band management, wherein it shares the one or more networking ports integrated in the network chip through the NC-SI block.

31. The method of claim 29, further comprising:
providing a permissions table that contains values indicating allowed access to the registers in the network chip by the external BMC, wherein default values of the values in the permissions table allow minimal and non-secured access by the external BMC to only those registers that are network related.

32. The method of claim 31, further comprising:
matching a requested address of the registers in a command by the external BMC that requires a read or write operation to one of the registers against the values listed in the permissions table to determine allowed access to the registers by the external BMC.

33. The method of claim 31, further comprising:
providing a secured register access indicator that enable permissions table checking.

34. The method of claim 31, further comprising:
maintaining the permissions table in a secured address space, wherein the permissions table cannot be changed except by a secured request.

35. The method of claim 29, further comprising:
checking access permission to the registers by the external BMC based on a plurality of pre-specified access policies.

36. The method of claim 29, further comprising:
examining each of the data packets to determine whether the data packet is an NC-SI command or a pass through packet.

37. The method of claim 36, further comprising:
either processing the data packet if it includes an NC-SI compliant command or passing the data packet to the designated networking port to be transmitted over the network if it is a pass through packet.

38. The method of claim 37, further comprising:
providing responses/processing results of the NC-SI command to the external BMC.

* * * * *